(12) United States Patent
Ganev et al.

(10) Patent No.: US 7,301,310 B2
(45) Date of Patent: Nov. 27, 2007

(54) EXCITATION CONTROLLED SYNCHRONOUS PERMANENT MAGNET MACHINE

(75) Inventors: Evgeni Ganev, Torrance, CA (US); William H. Warr, Glendale, CA (US); Carol A. Oximberg, Los Angeles, CA (US)

(73) Assignee: Honeywell International, Inc., Morristown, NJ (US)

( * ) Notice: Subject to any disclaimer, the term of this patent is extended or adjusted under 35 U.S.C. 154(b) by 28 days.

(21) Appl. No.: 11/210,311

(22) Filed: Aug. 24, 2005

(65) Prior Publication Data

US 2007/0046266 A1   Mar. 1, 2007

(51) Int. Cl.
  *H02H 7/06* (2006.01)
  *H02P 9/00* (2006.01)
  *H02P 11/00* (2006.01)
  *F02N 11/04* (2006.01)
  *H02K 23/52* (2006.01)

(52) U.S. Cl. .................. 322/28; 290/46; 310/179; 310/180; 310/184; 310/216

(58) Field of Classification Search ........ 310/179–180, 310/184, 216; 290/46; 322/28
  See application file for complete search history.

(56) References Cited

U.S. PATENT DOCUMENTS

| | | | | | |
|---|---|---|---|---|---|
| 2,079,488 | A | * | 5/1937 | Champlin | 323/260 |
| 2,604,616 | A | * | 7/1952 | Edwards | 388/806 |
| 2,790,123 | A | * | 4/1957 | Pestarini | 318/146 |
| 2,886,763 | A | * | 5/1959 | Zelina | 322/25 |
| 3,122,696 | A | * | 2/1964 | Philip et al. | 322/20 |
| 3,132,296 | A | * | 5/1964 | Nippes | 322/58 |
| 3,230,434 | A | * | 1/1966 | Bauerlein | 318/138 |
| 3,334,254 | A | * | 8/1967 | William | 310/156.07 |
| 3,341,768 | A | * | 9/1967 | Kelly | 322/24 |
| 3,414,789 | A | * | 12/1968 | Prouty | 318/786 |
| 3,479,543 | A | * | 11/1969 | Drexler | 310/162 |
| 3,671,788 | A | * | 6/1972 | Louis et al. | 310/156.55 |
| 3,671,789 | A | * | 6/1972 | Menzies | 310/163 |
| 3,702,964 | A | * | 11/1972 | Kudlacik et al. | 322/59 |
| 3,702,965 | A | * | 11/1972 | Drexler et al. | 322/25 |

(Continued)

OTHER PUBLICATIONS

Inconel® alloy 718, Special Metals, 28 pages, http://www.specialmetals.com/documents/Inconel%20alloy%20718.pdf.*

(Continued)

*Primary Examiner*—Julio Gonzalez
*Assistant Examiner*—Pedro J. Cuevas
(74) *Attorney, Agent, or Firm*—Oral Caglar, Esq.

(57) ABSTRACT

The present invention provides an apparatus and methods for providing constant voltage from a permanent magnet generator at varying prime mover speeds or under varying loads. A constant voltage permanent magnet generator includes a housing, a magnetized rotor, a prime mover operationally coupled with the rotor, a stator, a main winding coupled to the stator, and an excitation winding also coupled to the stator. A controllable three-phase inverter may be coupled to the excitation winding and a control system operationally coupled to the main winding for measuring the voltage of the main winding. The control system is further operationally coupled between the power source and the controllable three phase inverter to provide a supplemental current to the excitation winding such that a combined current through the main winding and the excitation winding produces a constant voltage from the generator.

19 Claims, 11 Drawing Sheets

U.S. PATENT DOCUMENTS

| | | | | |
|---|---|---|---|---|
| 3,840,763 A | * | 10/1974 | Baumann et al. | 310/156.56 |
| 4,070,593 A | * | 1/1978 | Von Musil et al. | 310/194 |
| 4,127,786 A | * | 11/1978 | Volkrodt | 310/156.84 |
| 4,223,263 A | | 9/1980 | Hansen, Jr. et al. | 322/47 |
| 4,260,921 A | * | 4/1981 | Silver | 310/156.59 |
| 4,302,693 A | * | 11/1981 | Burgmeier et al. | 310/156.59 |
| 4,327,302 A | * | 4/1982 | Hershberger | 310/156.56 |
| 4,336,649 A | * | 6/1982 | Glaser | 29/598 |
| 4,339,874 A | * | 7/1982 | Mc'Carty et al. | 29/598 |
| 4,354,126 A | * | 10/1982 | Yates | 310/156.59 |
| 4,395,671 A | * | 7/1983 | Sandler et al. | 318/786 |
| 4,405,873 A | * | 9/1983 | Nondahl | 310/156.56 |
| 4,477,767 A | * | 10/1984 | Cotzas | 322/59 |
| 4,486,678 A | * | 12/1984 | Olson | 310/156.28 |
| 4,543,506 A | * | 9/1985 | Kawada et al. | 310/156.59 |
| 4,564,778 A | * | 1/1986 | Yoshida | 310/177 |
| 4,631,435 A | * | 12/1986 | McCarty | 310/156.77 |
| 4,645,961 A | * | 2/1987 | Malsky | 310/156.07 |
| 4,658,165 A | * | 4/1987 | Vanderschaeghe | 310/156.57 |
| 4,658,167 A | * | 4/1987 | Popov et al. | 310/156.55 |
| 4,672,253 A | * | 6/1987 | Tajima et al. | 310/269 |
| 4,700,097 A | * | 10/1987 | Kawada et al. | 310/162 |
| 4,743,777 A | * | 5/1988 | Shilling et al. | 290/46 |
| 4,755,736 A | | 7/1988 | Fluegel | 322/46 |
| 4,916,346 A | * | 4/1990 | Kliman | 310/216 |
| 4,998,032 A | * | 3/1991 | Burgbacher | 310/51 |
| 5,013,951 A | * | 5/1991 | Stadnik et al. | 310/156.07 |
| 5,038,065 A | * | 8/1991 | Matsubayashi et al. | 310/162 |
| 5,040,286 A | * | 8/1991 | Stark | 29/598 |
| 5,041,749 A | * | 8/1991 | Gaser et al. | 310/156.22 |
| 5,066,880 A | * | 11/1991 | Banon | 310/156.55 |
| 5,191,256 A | * | 3/1993 | Reiter et al. | 310/156.49 |
| 5,237,737 A | * | 8/1993 | Zigler et al. | 29/598 |
| 5,250,867 A | * | 10/1993 | Gizaw | 310/179 |
| 5,280,209 A | * | 1/1994 | Leupold et al. | 310/156.41 |
| 5,298,827 A | * | 3/1994 | Sugiyama | 310/156.28 |
| 5,304,882 A | * | 4/1994 | Lipo et al. | 310/156.53 |
| 5,345,669 A | * | 9/1994 | Zigler et al. | 29/598 |
| 5,386,161 A | * | 1/1995 | Sakamoto | 310/49 R |
| 5,504,382 A | * | 4/1996 | Douglass et al. | 310/156.25 |
| 5,563,463 A | * | 10/1996 | Stark | 310/156.28 |
| 5,682,072 A | * | 10/1997 | Takahashi | 310/156.46 |
| 5,714,821 A | * | 2/1998 | Dittman | 310/179 |
| 5,780,944 A | * | 7/1998 | Sakamoto | 310/49 R |
| 5,955,809 A | | 9/1999 | Shah | 310/198 |
| 5,973,431 A | * | 10/1999 | Li et al. | 310/168 |
| 6,097,127 A | * | 8/2000 | Rivera | 310/184 |
| 6,172,438 B1 | * | 1/2001 | Sakamoto | 310/156.26 |
| 6,271,616 B1 | * | 8/2001 | Akemakou | 310/261 |
| 6,274,960 B1 | * | 8/2001 | Sakai et al. | 310/156.02 |
| 6,380,654 B1 | * | 4/2002 | Dokonal et al. | 310/156.53 |
| 6,448,680 B1 | * | 9/2002 | Akemakou | 310/156.41 |
| 6,504,272 B2 | * | 1/2003 | Sakamoto | 310/49 R |
| 6,509,664 B2 | * | 1/2003 | Shah et al. | 310/181 |
| 6,713,708 B2 | * | 3/2004 | Hedberg | 219/98 |
| 6,768,242 B1 | * | 7/2004 | Suzuki et al. | 310/218 |
| 6,784,585 B2 | * | 8/2004 | Shah et al. | 310/181 |
| 6,800,977 B1 | * | 10/2004 | Ostovic | 310/156.38 |
| 6,847,149 B2 | * | 1/2005 | De Filippis | 310/216 |
| 6,867,525 B2 | * | 3/2005 | Ionel et al. | 310/156.47 |
| 6,900,571 B2 | * | 5/2005 | Yoshino et al. | 310/211 |
| 6,919,663 B2 | * | 7/2005 | Iles-Klumpner | 310/156.53 |
| 6,940,198 B2 | * | 9/2005 | Ionel et al. | 310/156.47 |
| 7,057,323 B2 | * | 6/2006 | Horst | 310/191 |
| 7,098,567 B2 | * | 8/2006 | Ionel et al. | 310/216 |
| 7,143,503 B2 | * | 12/2006 | Ionel et al. | 29/596 |
| 7,183,667 B2 | * | 2/2007 | Colby et al. | 307/19 |
| 7,183,687 B2 | * | 2/2007 | Ionel et al. | 310/184 |
| 2002/0053850 A1 | * | 5/2002 | Shah et al. | 310/166 |
| 2003/0102759 A1 | * | 6/2003 | Shah et al. | 310/181 |
| 2003/0164357 A1 | * | 9/2003 | Hedberg | 219/98 |
| 2005/0135031 A1 | * | 6/2005 | Colby et al. | 361/78 |
| 2006/0214533 A1 | * | 9/2006 | Miyashita et al. | 310/216 |
| 2007/0012492 A1 | * | 1/2007 | Deng et al. | 180/65.1 |

OTHER PUBLICATIONS

Inconel® 600, HP Alloys, 3 pages, http://www.hpalloy.com/DataSheets/600.htm.*

* cited by examiner

EXCITATION CONTROLLED SYNCHRONOUS PERMANENT MAGNET MACHINE

BACKGROUND OF THE INVENTION

The present invention relates generally to apparatus and methods for providing constant voltage from a permanent magnet generator at varying prime mover speeds or under varying loads.

A conventional salient pole synchronous machine, or wound rotor machine, can provide constant voltage output, but without a gear-reduction stage it is incompatible with high-speed prime movers. Further, this type of machine has poor reliability and low efficiency. In contrast, the rotor construction of permanent magnet generators is robust and allows for high-speed operation, but excitation must be fixed unless a full-scale three phase switching bridge or active power electronics with similar complexity are used to condition the variable voltage produced by a permanent magnet generator. Three phase switching bridges are very expensive for high power applications. They also present reduced reliability and increased volume and weight. The losses in the switching devices are also substantial.

Prior art patents such as U.S. Pat. Nos. 4,755,736 and 4,223,263 describe a main generator and a second permanent magnet generator/exciter. The main generator has a single ac winding positioned on a stator and a single dc winding positioned on a rotor. The dc rotor winding receives excitation from the permanent magnet generator/exciter mounted on the rotor. The generator output voltage is controlled by the magnitude of dc current present in the dc rotor winding. A mechanical source of power is required to drive the rotor.

U.S. Pat. No. 5,955,809 describes a dual axial gap permanent magnet generator that requires two inversions, from ac to dc and from dc to ac, to control the voltage output.

As can be seen, there is a need for producing voltage in a relatively narrow controlled range. At the same time, the prime mover should operate at variable speed in order to have fuel efficient performance.

SUMMARY OF THE INVENTION

In one aspect of the present invention, a constant voltage permanent magnet generator comprises a housing and a rotor positioned within the housing, the rotor being magnetized; a prime mover operationally coupled to the rotor; a stator positioned within the housing around the rotor; a main winding coupled to the stator; an excitation winding coupled to the stator; a power source coupled to the excitation winding; and a control system operationally coupled to the main winding for measuring current through the excitation winding, the control system further being operationally coupled between the power source and the excitation winding to provide current to the excitation winding such that a combined current through the main winding and the excitation winding produces a constant voltage.

In another aspect of the present invention, a constant voltage permanent magnet generator comprises a housing; a rotor positioned within the housing, the rotor being magnetized; a slotted stator positioned within the housing around the rotor; a three phase main winding coupled to the stator and attached to a load; a three phase excitation winding coupled to the stator; a power source coupled to the excitation winding; and a control system operationally coupled between the excitation winding and the power source, the control system being adapted for measuring current through the excitation winding and providing power from the power source to the excitation winding such that the control system selectively provides power to the excitation winding such that a combined current through the main winding and the excitation winding produces a constant voltage in the main winding.

In an aspect of the present invention, a constant voltage permanent magnet generator comprises a housing; a rotor positioned within the housing, the rotor being magnetized; a slotted stator positioned within the housing around the rotor; a three phase main winding coupled to the stator and attached to a load; a three phase excitation winding coupled to the stator; a power source coupled to the excitation winding; a control system operationally coupled between the excitation winding and the power source, the control system being adapted for measuring current through the excitation winding and providing power from the power source to the excitation winding such that the control system selectively provides power to the excitation winding such that a combined current through the main winding and the excitation winding produces a constant voltage in the main winding; the rotor including a nickel-based alloy, such as an INCONEL® alloy, sleeve positioned around a magnetized core; and a bore seal positioned around the nickel-based alloy sleeve; and wherein the main winding and the excitation winding are magnetically coupled together; wherein the main winding and the excitation winding are coupled together within a slot of the stator; wherein the slot is one of a plurality of slots of the slotted stator are arranged radially around the rotor; wherein the main winding is positioned is within the slot adjacent to the rotor and the excitation winding is positioned within the slot such that the main winding is positioned between the excitation winding and the rotor; wherein the stator comprises a laminated core of high-grade silicon steel; and wherein the rotor is constructed of a material selected from the group consisting of samarium cobalt and neodymium iron.

In a further aspect of the present invention, a method of providing constant voltage from a generator having a variable load comprises the steps of providing a generator having a rotor, stator, a main winding carried on the stator, an excitation winding carried on the stator, and a control system to selectively control supplemental current to the excitation winding; providing torque to the generator to maintain a constant generator speed; connecting the main winding to a load; calculating a current for the excitation winding to combine with current through the main winding to produce a reference voltage; and adjusting current to the excitation winding such that the generator produces the reference voltage.

These and other features, aspects and advantages of the present invention will become better understood with reference to the following drawings, description and claims.

DETAILED DESCRIPTION OF THE INVENTION

Figure 1:
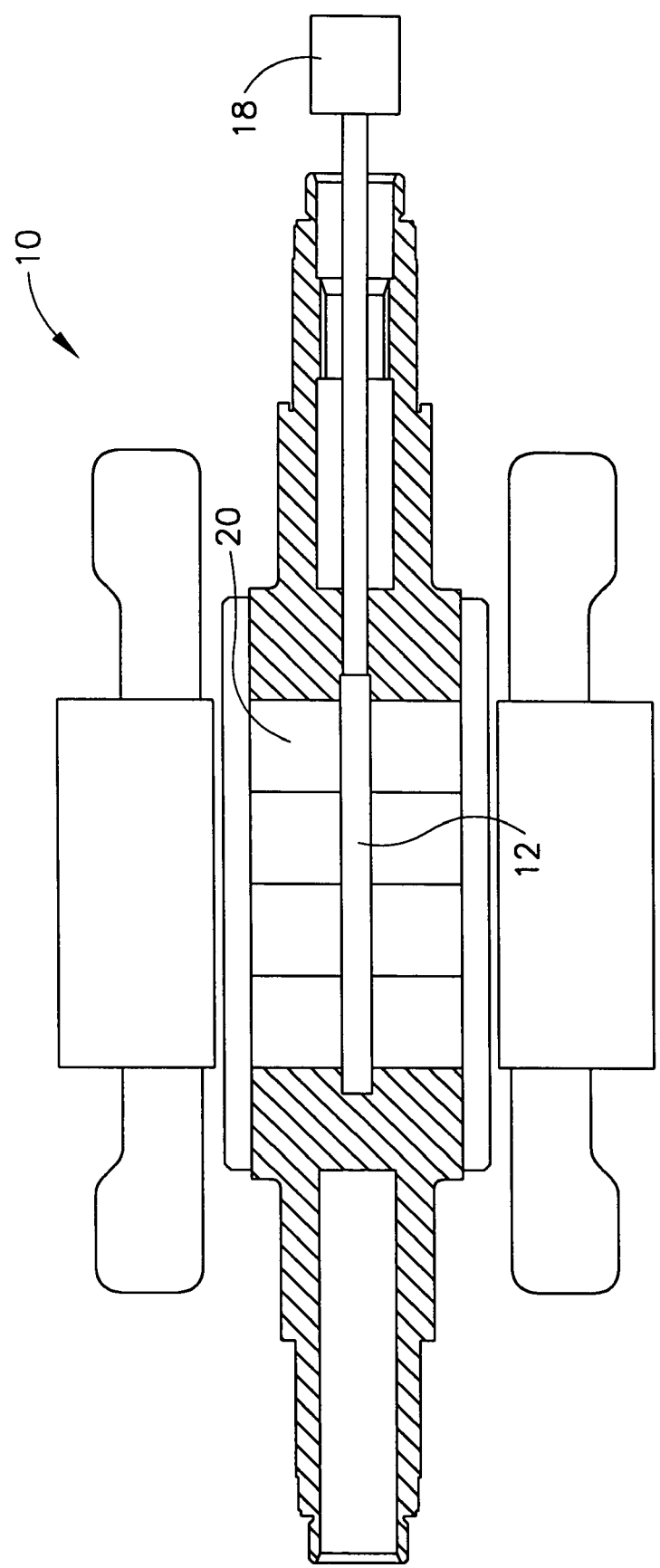
FIG. 1 is a cross-sectional view of an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is applicable to power generation systems where the prime mover operates at variable and high speed for fuel efficiency and a constant output voltage is required. The present invention provides an optimized solution for power generation in various applications, including non-conventionally powered vehicles such as hybrid vehicles.

The present invention differs from the prior art by providing a single generator with an ac main winding and an ac excitation winding both located on a stator that provide a combined current to produce constant voltage in the main winding under varying loads and with a variable high speed prime mover. In contrast to the present invention, prior art systems utilize multiple separated ac and dc windings, gear reduction stages, expensive full scale three phase switching bridges, or complex active power electronics.

With reference to FIGS. 1 through 6 a generator 10 of the present invention may include a rotor 12 that may be of two-pole or multi-pole permanent-magnet construction using samarium cobalt or neodymium iron depending on the rotor temperature during use. Other magnet materials for the rotor can also be used. The rotor 12 can be radial, parallel or axial magnetized for application in both radial and axial permanent-magnet generators. A stator 20 may include a plurality of slots 30. The stator 20 may have a laminated core 22 made of high-grade silicon steel. The stator 20 may carry a three-phase excitation winding 24 and a three phase main winding 26. The excitation winding 24 and the main winding 26 may be installed in the same stator slot 30 for good magnetic coupling.

Figure 2:
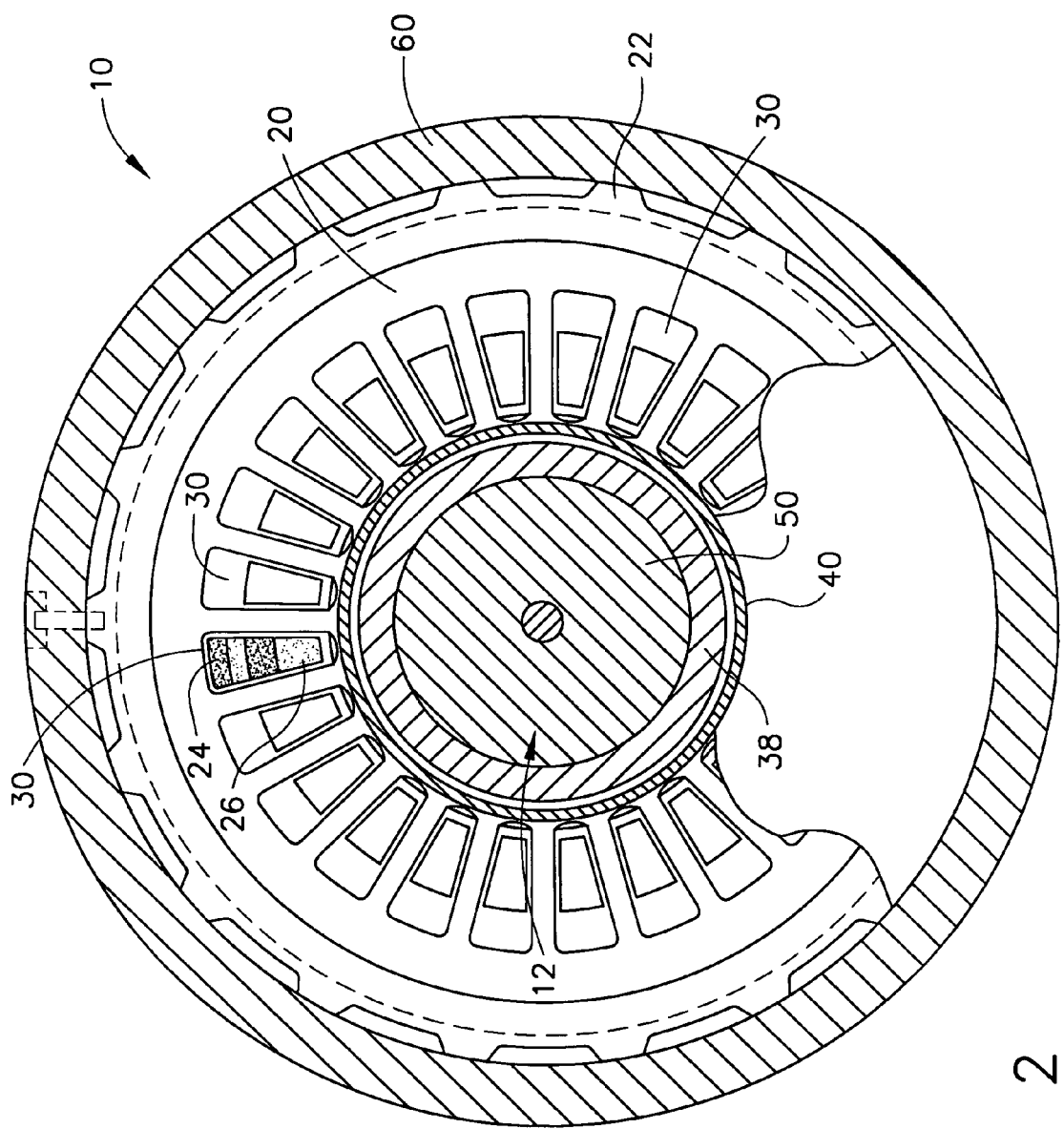
FIG. 2 is a cross-sectional view of the present invention.

As shown in FIG. 2, a housing 60 may surround the rotor 12. The rotor 12 may include a nickel-based alloy, such as an INCONEL® alloy sleeve 38 positioned around a magnetized core 50. A bore seal 40 may be positioned around the nickel-based alloy sleeve 38.

Figure 3:
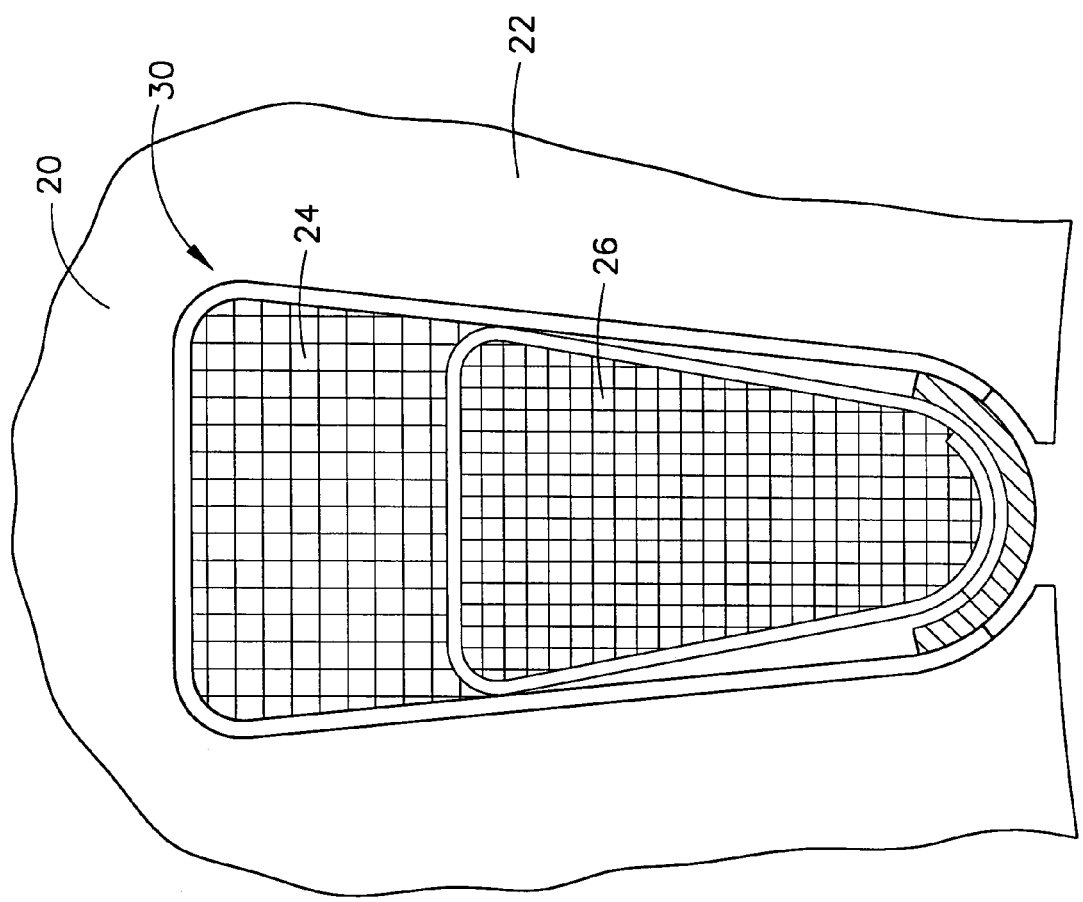
FIG. 3 is an enlarged view of a slot of the stator of the present invention.
Figure 6:
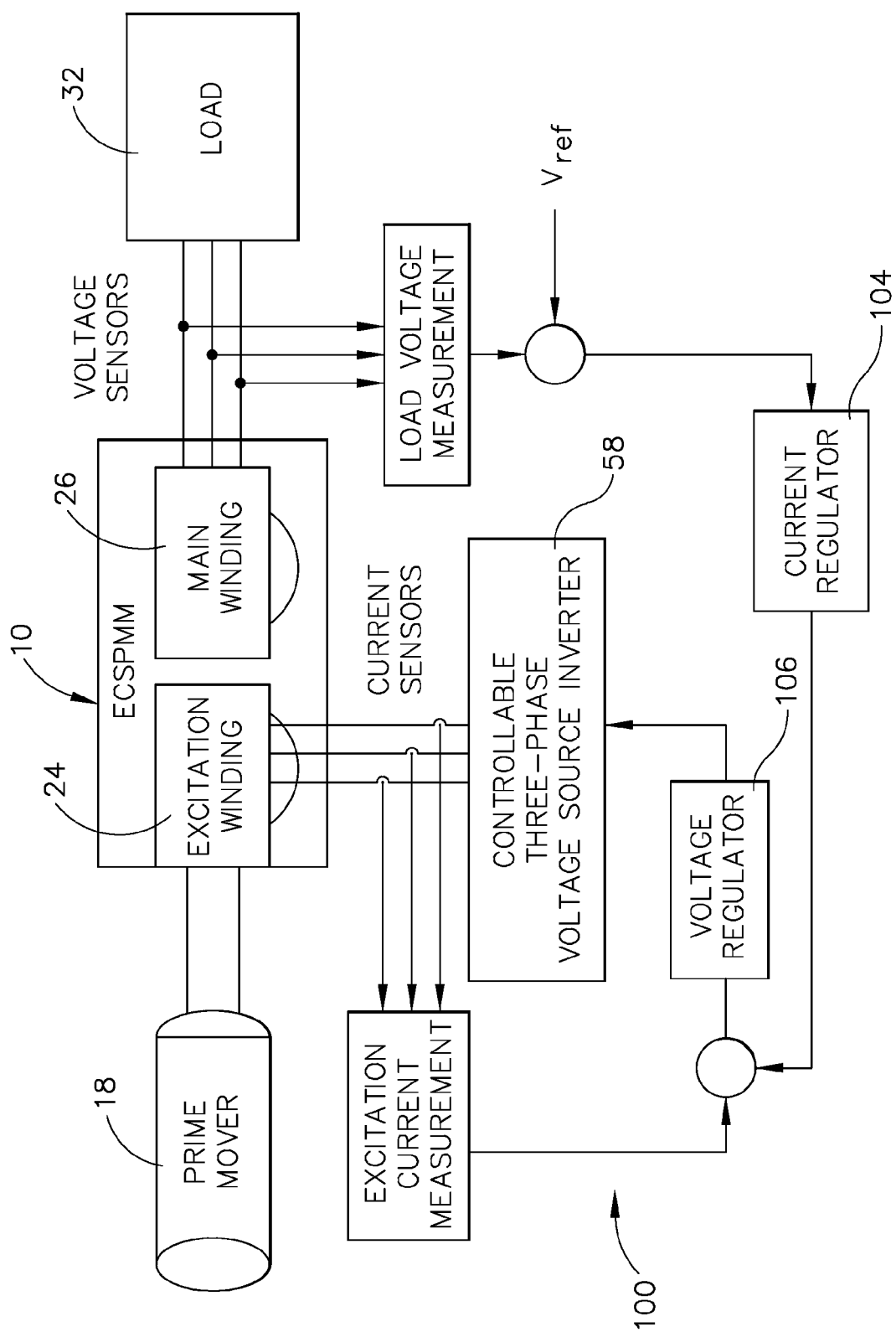
FIG. 6 is a schematic diagram of the control system of the present invention.

FIG. 3 shows detail from the stator slot 30 for the mutual location of the excitation winding 24 and main winding 26 within the slot 30. The main winding 26 may be positioned within the slot 30 adjacent to the rotor 12, and the excitation winding 24 may be positioned within the slot 30 such that the main winding 26 is positioned between the excitation winding 24 and the rotor 12. Different placements and different arrangements of both the main winding 26 and the excitation winding 24 can also be accomplished under the invention. A control system 100 as shown in FIG. 6 may be operationally coupled between a power source comprising a three-phase voltage source 58 and the excitation winding 24 to control current supplied to the excitation winding 24 during use.

Figure 4:
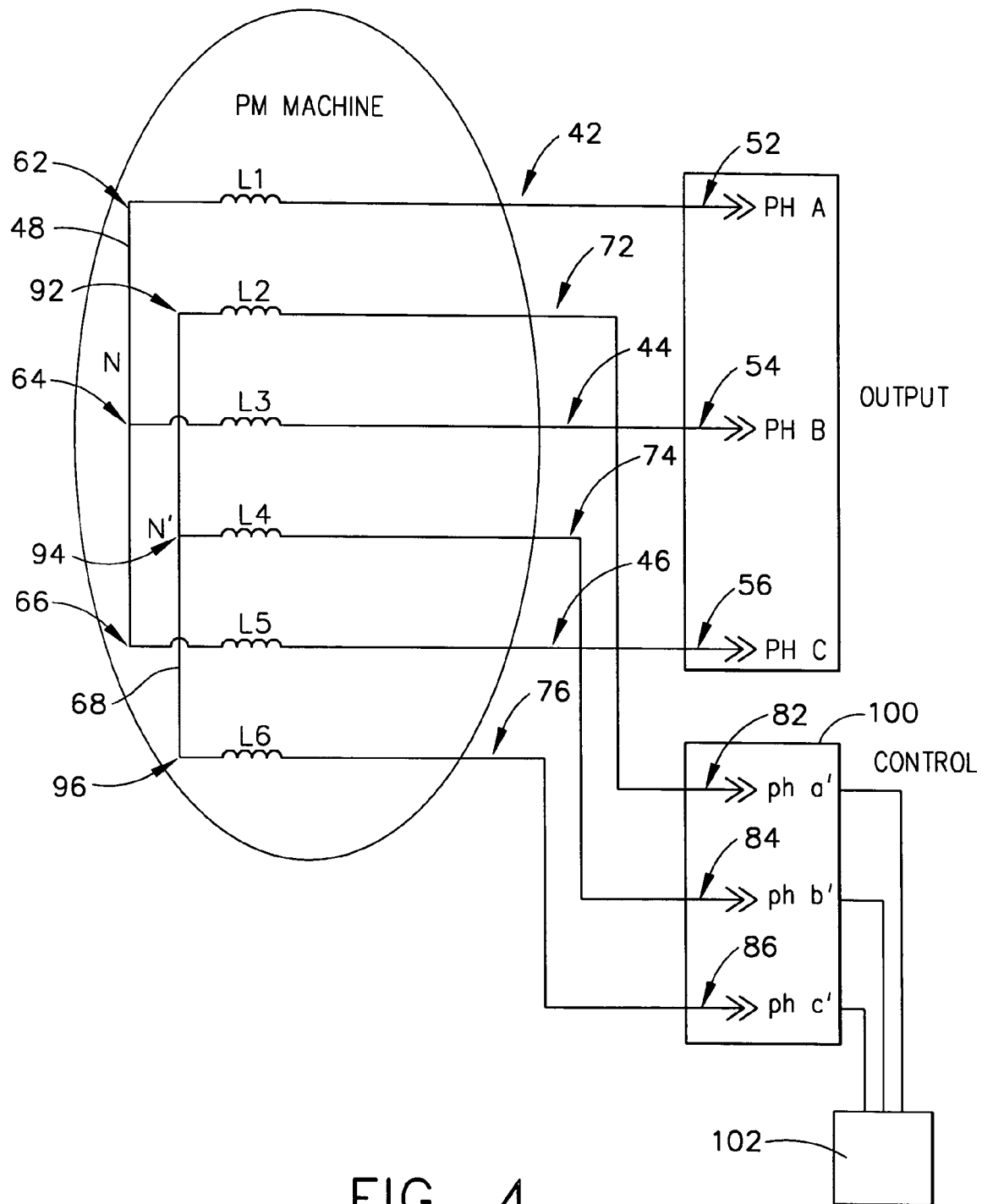
FIG. 4 is a diagram of the winding arrangements of the present invention.

The three-phase excitation winding 24 may be supplied with current from a three-phase voltage source 58 while the three-phase main winding 26 may be connected to a three-phase load 32. As shown in FIG. 4, main winding phase L1 42, main winding phase L3 44, and main winding phase L5 46 comprise the main winding 26 where the power is generated. The main winding load terminal 52, main winding load terminal 54, and main winding load terminal 56 may be connected to the load 32. Main winding neutral terminal 62, main winding neutral terminal 64, and main winding neutral terminal 66 of main winding phase L1 42, main winding phase L3 44, and main winding phase L5 46 may be connected together to a neutral connection 48 forming a star of the main winding 26.

The excitation winding phase L2 72, excitation winding phase L4 74, and excitation winding phase L6 76 may comprise the excitation winding 24 where the current for excitation or control is applied. The excitation winding power source terminal 82, excitation winding power source terminal 84, and excitation winding power source terminal 86 may be connected to the power source 58 for excitation current. The excitation winding neutral terminal 92, excitation winding neutral terminal 94, and excitation winding neutral terminal 96 of the excitation phases may be connected together to an excitation winding neutral connection 68 forming a star, of the excitation winding 24. The main winding 26 and excitation winding 24 may be arranged to have a high degree of coupling between the main winding 26 and the excitation winding 24 to enhance controllability of the invention.

The three-phase excitation winding 24 may be supplied from a three-phase voltage source 58. The flux produced by the main winding 26 and the excitation winding 24 is a rotational flux that combines with the rotational flux produced by the rotor 12. The direction of the current through the three-phase excitation winding 24 is such that flux from the excitation winding 24 may add or subtract to the rotor flux creating a modified flux. The resultant rotational flux, which produces a no-load voltage at the main winding load terminal 52, main winding load terminal 54, and main winding load terminal 56 of the main windings. The generator no-load voltage can be increased or decreased by modifying the level of the excitation current. The generator no-load voltage can be adjusted between two levels: a minimum level corresponding to zero current through the excitation winding 24, and a maximum value corresponding to a maximum current through the excitation winding 24. Under normal conditions, the generator voltage will be adjusted between these two limits. When the generator 10 is loaded, the generator output voltage would have a tendency to decrease due to the impedance drop across the main winding 26. This drop may then be compensated for by modifying the excitation current. When the load is large, more current will be required through the excitation winding 24. When the load is small, less excitation current is required to maintain the output voltage at the desired value. The generator output voltage maintained constant as the load varies by controlling the amplitude and angle of the excitation current with respect to the terminal voltage of the excitation winding 24.

The excitation current provided by the three-phase voltage source 58 may be purely reactive to reduce the excitation power used or to eliminate need for supplemental power.

Figure 5:
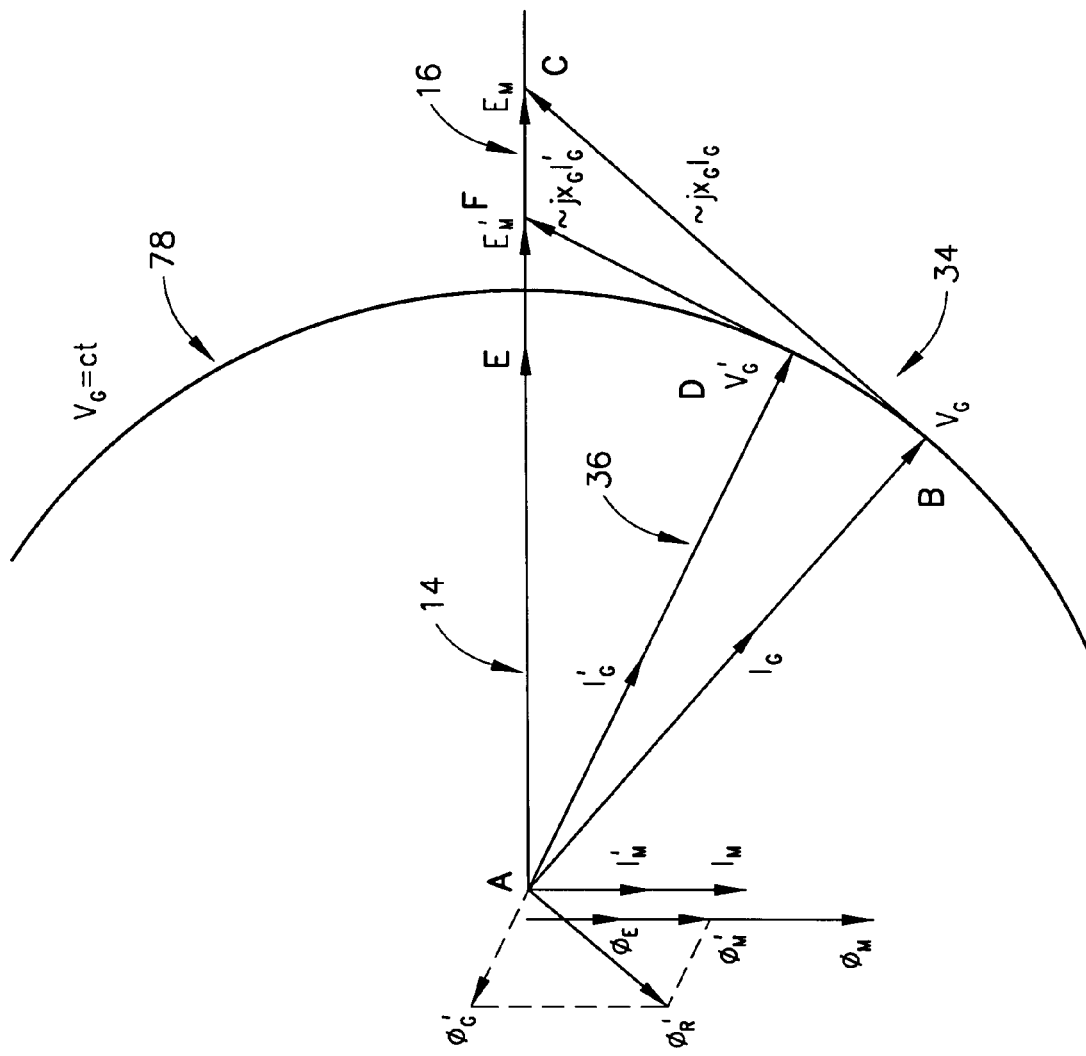
FIG. 5 is a phasorial diagram of the present invention.

In FIG. 5, the E phasor 14 represents the no load voltage with no excitation current through the winding. The Em phasor 16 corresponds to the maximum no-load voltage when maximum excitation current, Im, is present. The locus of the generator voltage is the curve 78. The two resistive load conditions for the generator may be represented by triangles 34 and 36. The triangle ABC 34 corresponds to the maximum generator resistive loading while the triangle ADF 36 corresponds to a reduced generator loading. The generator terminal voltage maintained constant by decreasing the generator no load voltage from Em to Em'. This accomplished by reducing the current through the excitation winding 24.

When the speed of the prime mover varies, the no load voltage of the generator 10 may vary in a linear relationship. Similar results achieved to maintain constant machine terminal voltage. Also shown in FIG. 5 are the three flux levels corresponding to voltages E, EM and EM'. The generator armature reaction flux ϕG combines with the flux ϕ'M to create the resultant air-gap flux ϕ'R.

In an aspect of the invention, a prime mover 18 provides the torque to the generator 10 so as to maintain it at constant speed, irrespective of load. Connected to the excitation winding 24 of the generator 10 is a control system 100 including a three-phase voltage source 58. The main winding 26 of the generator 10 may be connected to the load. Voltage produced by the generator 10 may be measured. The voltage signal in the stator reference frame may be represented in the rotor reference frame by employing a sensor or sensor-less transformation. The sensed voltage in the rotor reference frame is then compared to the reference voltage and the error is applied to a current regulator 104 the output of which represents a component of the excitation current. The reference voltage is the desired voltage of the generator 10. The feedback current required to produce the voltage differential between the reference voltage and the voltage produced by the generator 10 may be compared to the measured current of the excitation winding 24. The error may be applied to a voltage regulator 106 the output of which represents the voltage components of the voltage required to control the level of required excitation current in the excitation winding 24, in such a way as to maintain a constant voltage at the generator output. With this arrangement, the controllable three-phase voltage source 58 may provide only reactive power to the excitation winding 24. There are a variety of possible control schemes that may be used in conjunction with the present invention, including use of either digital or analog control techniques.

A simulation program has been created to verify the concept for the present invention. The simulation model provides parallel calculation and accounts for generator 10 electrical parameters. The results from simulation support the invention operation described above and shown in FIG. 5. The results of the simulation are displayed as wave shapes in FIGS. 7, 8, and 9. A boost operation of adding current to the excitation winding 24 can be performed when the terminal voltage tends to be below the desired voltage value. A buck operation can be performed by reducing current in the excitation winding 24 when the terminal voltage tends to be above the desired voltage value. Thus, the terminal voltage of the generator 10 can be controlled consistently for variable prime mover 18 speeds. Further, the terminal voltage of the generator 10 can be controlled consistently for variable loads. The magnetic, thermal and mechanical designs of the generator 10 differs from known permanent magnet generators of the prior art by the inclusion, positioning, and control of the excitation winding 24. The excitation winding 24 may be positioned in a slot 30 in the stator 20 with the main winding 26 and controlled by application of a supplemental current to the excitation winding 24 to produce constant voltage.

Figure 7:
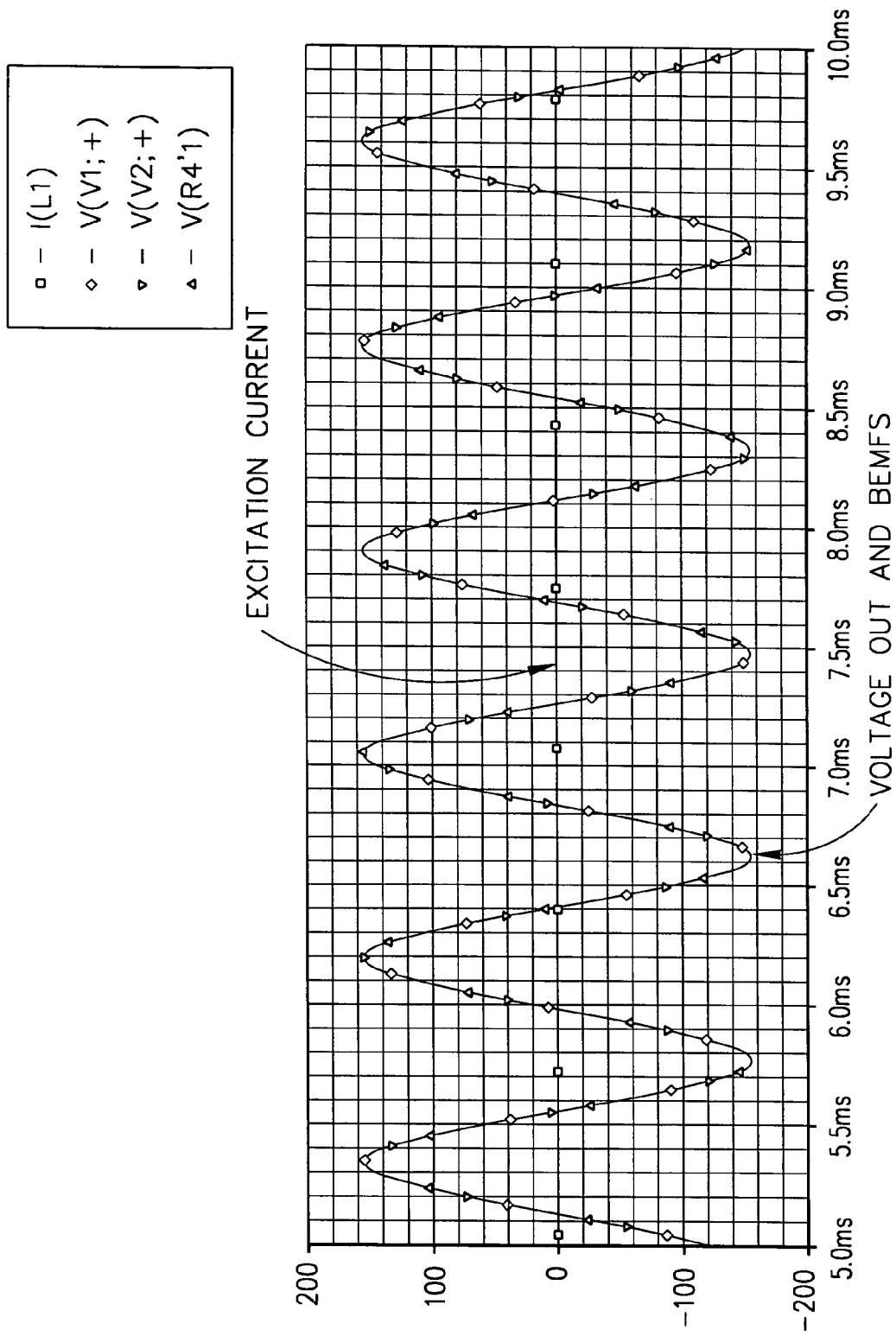
FIG. 7 is a graph of simulation results under no load, according to an embodiment of the present invention.
Figure 8:
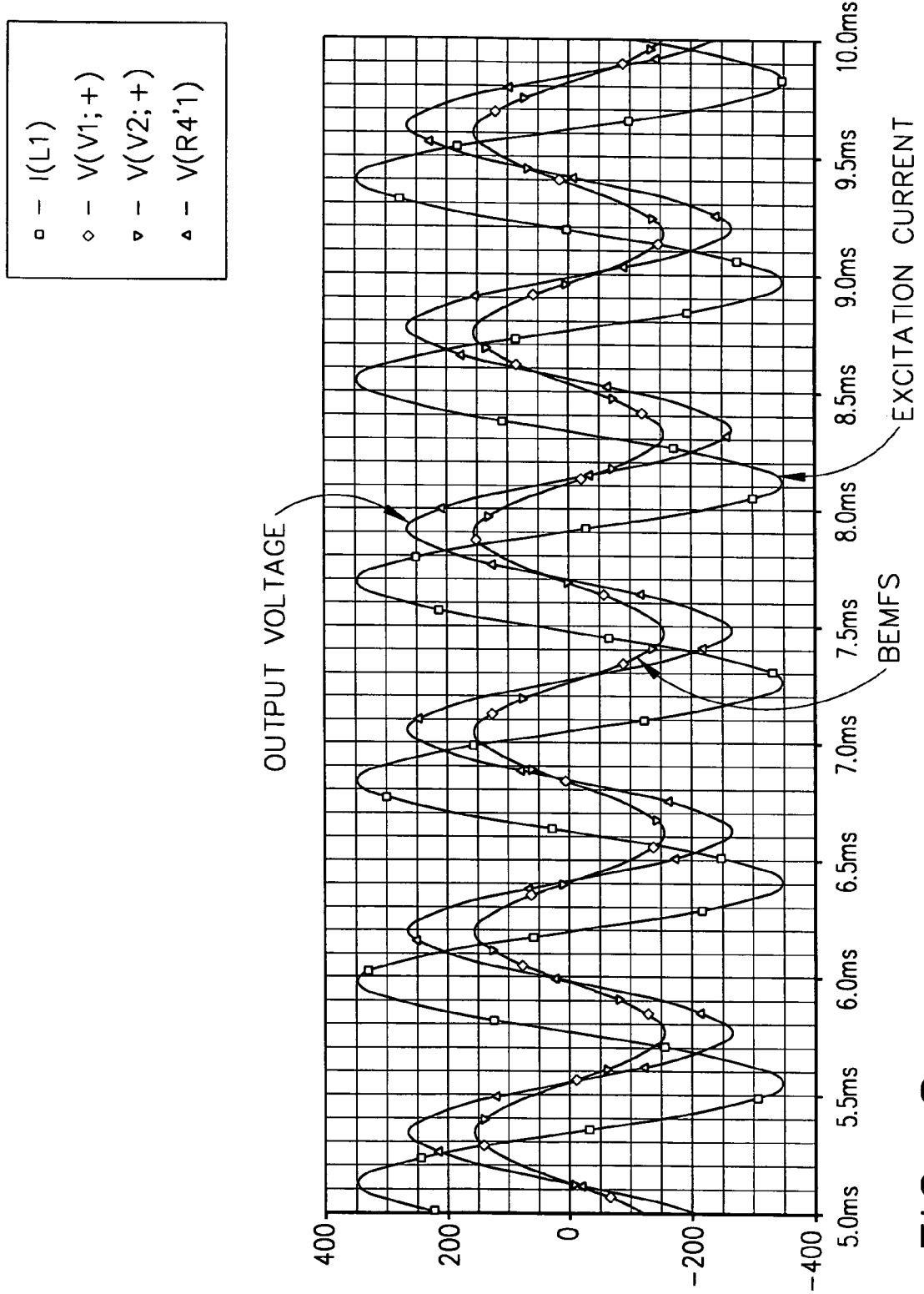
FIG. 8 is a graph of simulation results under applied 350 amps peak excitation current, according to an embodiment of the present invention.
Figure 9:
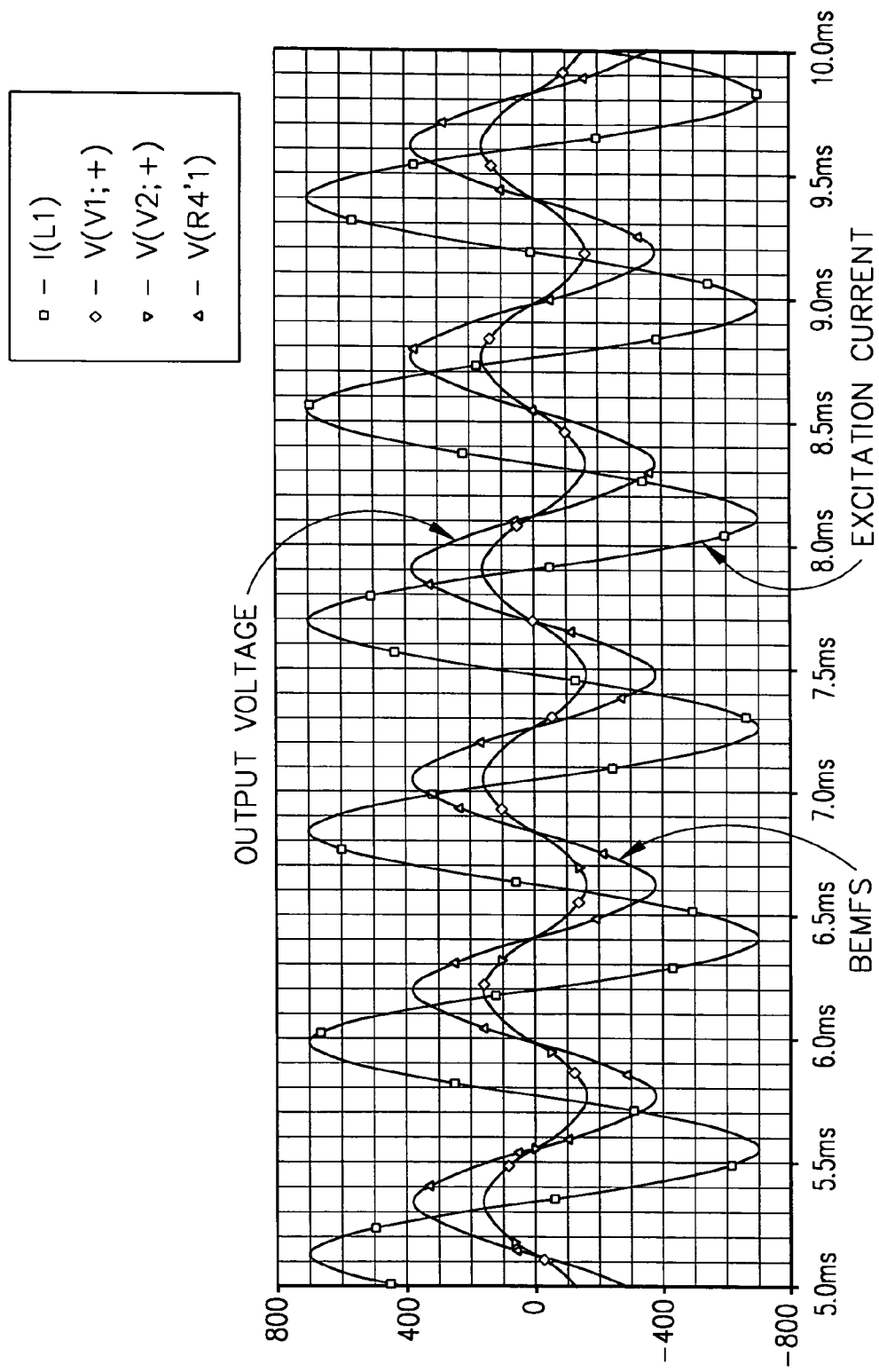
FIG. 9 is a graph of simulation results under applied 700 amps peak excitation current, according to an embodiment of the present invention.

The simulation results came from a control topology that was able to supply pure sinusoidal current in the excitation winding 24. The machine model had identical main and excitation windings (same inductances and back electric motive forces). FIG. 7 shows no excitation and main winding current gives identical voltages for voltage out and both back electric motive forces (Bemfs). FIGS. 8 and 9 show applied 350 amps (peak) and 700 amps (peak) current, respectively, to the excitation winding 24 and show the effect of this excitation current on the main winding output voltage. While the back electric motive forces remain the same, the main winding output voltage magnitude increases from the initial, no excitation current, condition of 150 VAC(peak) to 270 VAC(peak) and then to 390 VAC(peak). This simulation shows that as the main winding output voltage would drop with load, the control of current in the excitation winding 24 can compensate to maintain a constant voltage.

Figure 10:
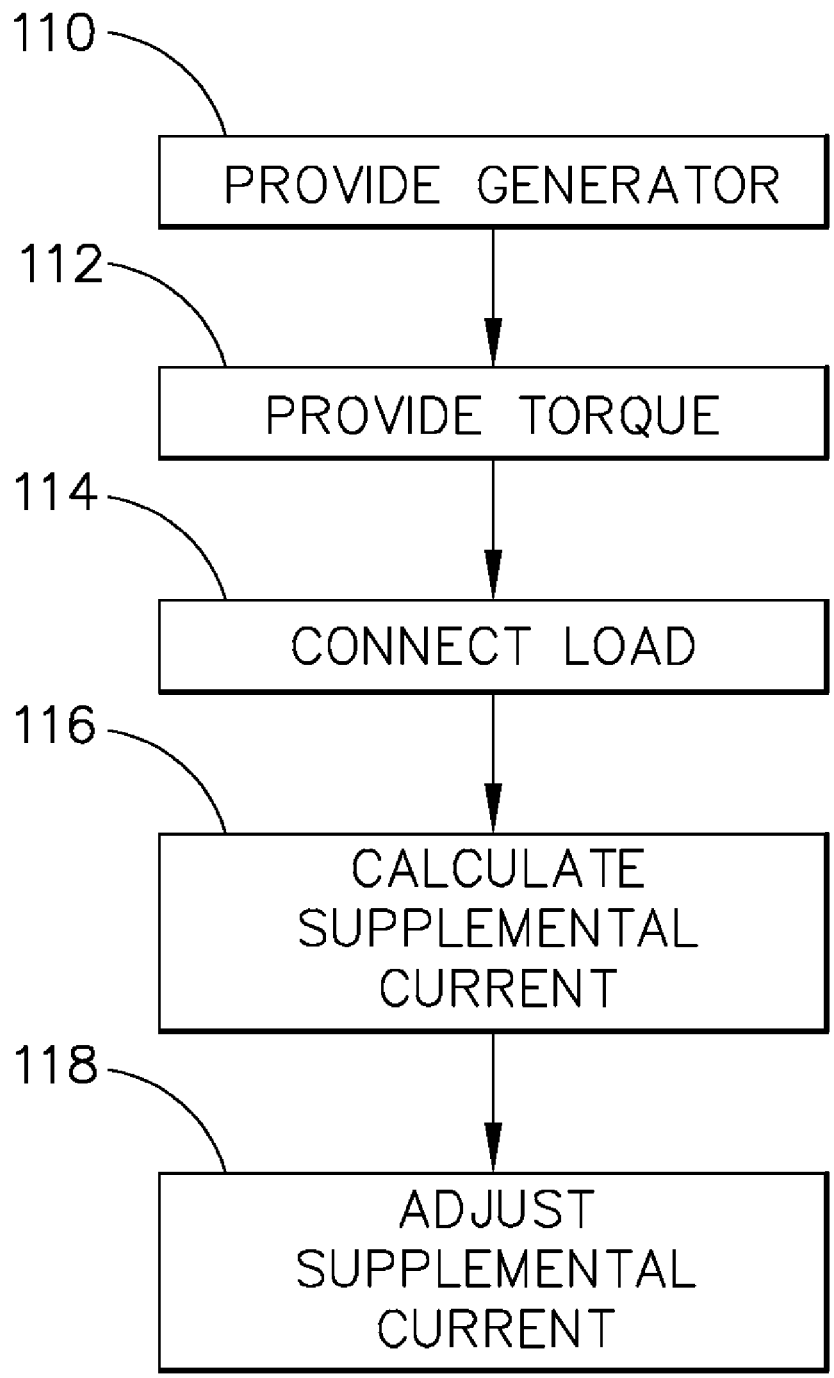
FIG. 10 is a flowchart showing the steps of a method of producing constant voltage from a permanent magnet generator according to an embodiment of the present invention.

As shown in the flow chart of FIG. 10, the method of the present invention may include the method step 110 of providing a generator 10 having a rotor 12, stator 20, a main winding 26 carried on the stator, an excitation winding 24 carried on the stator 20, and a control system 100 to selectively control supplemental current to the excitation winding 24. In method step 112 torque may be provided to the generator 10 to maintain a constant generator speed. In method step 114 the main winding 26 may be connected to a load 32. In a method step 116 an amount of supplemental current for the excitation winding 24 may be calculated to combine with current through the main winding 26 to produce a reference voltage. In a method step 118 the supplemental current to the excitation winding 24 may be adjusted such that the generator 10 produces the reference voltage.

Figure 11:
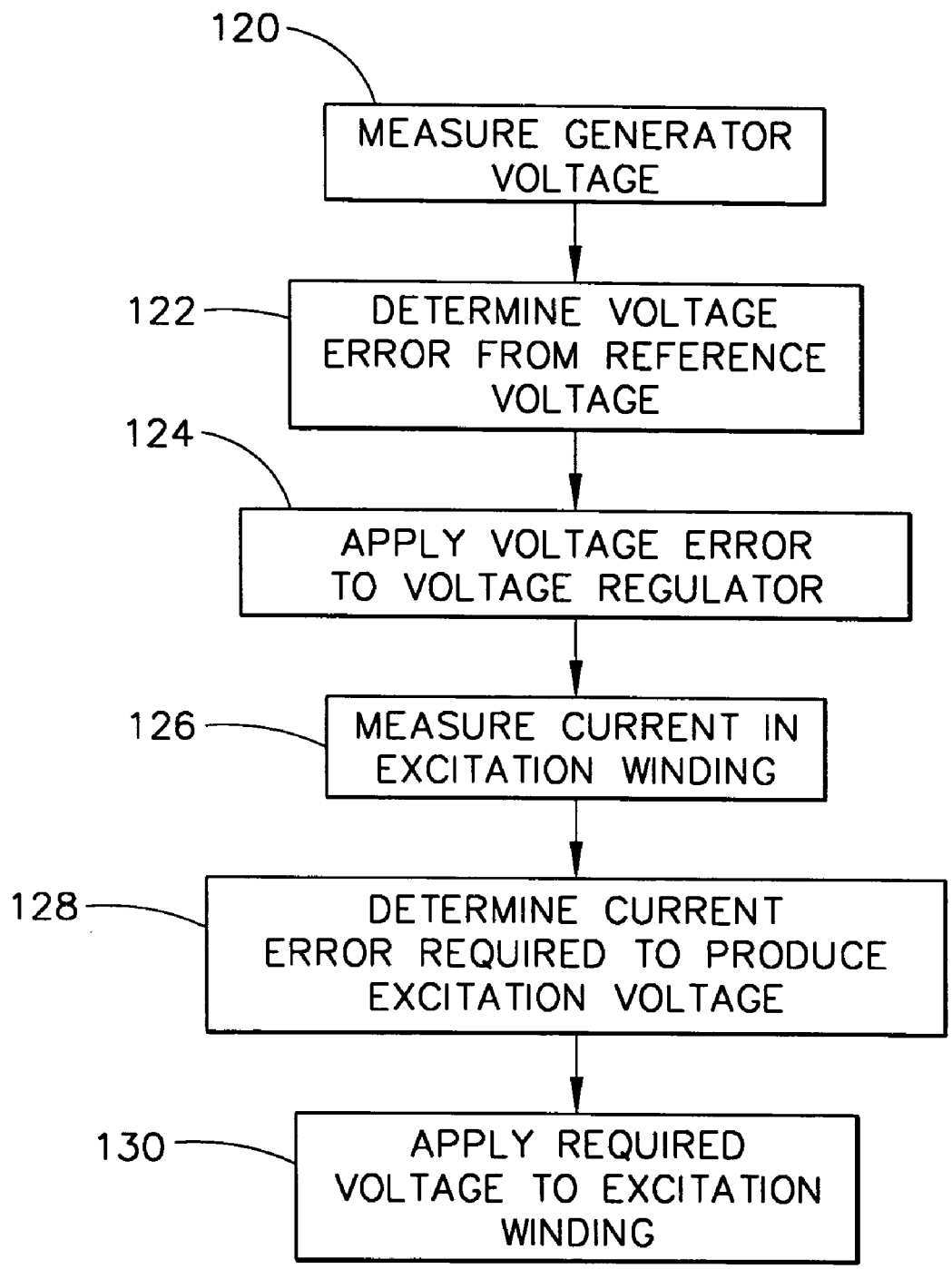
FIG. 11 is a flowchart showing the steps of a method of calculating current for the excitation winding according to an embodiment of the present invention.

As shown in FIG. 11, the method step 116 of calculating the supplemental current may comprise a method step 120 of measuring voltage produced from the generator 10 and a method step 122 of comparing the voltage produced to the reference voltage 106 to determine a voltage difference. In a method step 124 the voltage difference may be applied to a current regulator 104 to determine a current required to produce the voltage difference. In method step 126 current in the excitation winding 24 may be measured and compared to an output of the current regulator 104 to current in the excitation winding 24. In a method step 128 the supplemental current required to produce the total current required in the excitation winding 24 is determined to produce the voltage difference. In method step 130 the supplemental current may be applied to the excitation winding 24. The supplemental current may be applied to the excitation winding by a three phase voltage source 58 providing reactive power to the excitation winding 24. The voltage produced by the generator 10 may be measured by a sensor measuring voltage in a rotor reference frame. The method step 116 of calculating a current for the excitation winding and the method step 118 of adjusting current to the excitation winding may be performed repeatedly to provide constant voltage.

It should be understood, of course, that the foregoing relates to exemplary embodiments of the invention and that modifications may be made without departing from the spirit and scope of the invention as set forth in the following claims.

We claim:

1. A constant voltage generator comprising:
   a housing;
   a permanent magnet rotor positioned within said housing;
   a prime mover operationally coupled to said permanent magnet rotor;
   a stator positioned within said housing around said permanent magnet rotor;
   a main winding coupled to said stator;
   an excitation winding coupled to said stator;
   a power source coupled to said excitation winding; and
   a control system comprising a current regulating unit and a voltage source inverter, wherein said control system is operationally coupled to said main winding for measuring current through said main winding, said control system further being operationally coupled between said power source and said excitation winding to provide a supplemental current to said excitation winding such that a combined current through said main winding and said excitation winding produces a constant voltage in said main winding.

2. The constant voltage generator of claim 1 wherein said main winding and said excitation winding are magnetically coupled together.

3. The constant voltage generator of claim 1 wherein said main winding and said excitation winding are coupled together within a slot of said stator.

4. The constant voltage generator of claim 1 wherein said stator comprises a laminated core of high-grade silicon steel.

5. The constant voltage generator of claim 1 wherein said permanent magnet rotor is a two-pole permanent magnet constructed of a material selected from a group of materials consisting of samarium cobalt and neodymium iron.

6. The constant voltage generator of claim 1 wherein said permanent magnet rotor is a multi-pole permanent magnet constructed of a material selected from a group of materials consisting of samarium cobalt and neodymium iron.

7. The constant voltage generator of claim 1 wherein said housing, said permanent magnet rotor, said prime mover, said stator, said main winding, said excitation winding, said power source, and said control system, comprising a current regulating unit and a voltage source inverter, form a single machine producing a constant voltage.

8. A constant voltage generator comprising:
   a housing;
   a multi-pole, permanent magnet rotor positioned within said housing, said permanent magnet rotor having no windings attached thereto;
   a prime mover operatively coupled to said permanent magnet rotor;
   a slotted stator positioned within said housing around said permanent magnet rotor;
   a three phase main winding coupled to said stator and connected to a load;
   a three phase excitation winding coupled to said stator;
   a power source coupled to said excitation winding; and
   a control system comprising a current regulating unit and a voltage source inverter, wherein said control system is operationally coupled between said excitation winding and said power source, said control system being adapted for measuring current through said main winding and providing power from said power source to said excitation winding such that said control system selectively provides a supplemental current to said excitation winding such that a combined current through said main winding and said excitation winding produces a constant voltage in said main winding.

9. The generator of claim 8, wherein a plurality of slots in said stator are arranged radially around said permanent magnet rotor, and wherein said main winding and said excitation winding are magnetically coupled together within a slot of said stator.

10. The generator of claim 9 wherein:
    said main winding is positioned within said slot adjacent to said permanent magnet rotor, and
    said excitation winding is positioned within said slot such that said main winding is positioned between said excitation winding and said permanent magnet rotor.

11. The generator of claim 8 wherein said permanent magnet rotor is a two-pole permanent magnet constructed of a material selected from the group consisting of samarium cobalt and neodymium iron.

12. The generator of claim 8 wherein said permanent magnet rotor includes a nickel-based alloy sleeve positioned around a magnetized core.

13. The generator of claim 8, wherein said control system comprises:
    a load voltage measurement unit for measuring a voltage produced by the generator;
    said current regulating unit for receiving an error signal between a voltage sensed in the rotor reference frame and a reference voltage and for generating a feedback current in an amount required to produce a voltage differential between said reference voltage and said voltage produced by the generator;
    an excitation current measurement unit for measuring current in the excitation winding;
    a voltage regulating unit for receiving an error signal between said feedback current and said excitation winding current and determining an amount of supplemental current; and
    said voltage source inverter for applying the amount of supplemental current to said excitation winding required for the generator to produce the reference voltage.

14. The generator of claim 13 wherein said voltage source inverter provides reactive power to the excitation winding.

15. The generator of claim 13 further comprising a sensor for measuring the voltage in the rotor reference frame.

16. A constant voltage generator comprising:
    a housing;
    a multi-role, permanent magnet rotor positioned within said housing said permanent magnet rotor being a two-pole permanent magnet having no windings attached thereto and constructed of a material selected from a group of materials consisting of samarium cobalt and neodymium iron, wherein a nickel-based alloy sleeve is positioned around said rotor and, wherein a bore seal is positioned around said nickel-based alloy sleeve;
    a prime mover operationally coupled to said rotor;
    a slotted stator positioned within said housing around said rotor, wherein a plurality of slots in said stator are arranged radially around said rotor, and wherein said main winding and said excitation winding are magnetically coupled together within a slot of said stator;
    a three phase main winding coupled to said stator and connected to a load;
    a three phase excitation winding coupled to said stator;
    a power source coupled to said excitation winding; and a control system comprising a current regulating unit and a voltage source inverter, wherein said control system is operationally coupled to said main winding for measuring current through said main winding via a sensor in a rotor reference frame, wherein the voltage sensed in the rotor reference frame represents the voltage signal in the stator reference frame and, wherein said control system is further operationally coupled between said power source and said excitation winding to provide a supplemental current to said excitation winding such that a combined current through said main winding and said excitation winding produces a constant voltage in said main winding.

17. The generator of claim 16 wherein:

said main winding is positioned within said slot of said stator adjacent to said rotor, and said excitation winding is positioned within said slot such that said main winding is positioned between said excitation winding and said rotor.

18. The generator of claim 16 wherein said control system comprises:

a load voltage measurement unit for measuring a voltage produced by the generator;

said current regulating unit for receiving an error signal between the voltage sensed in the rotor reference frame and a reference voltage and for generating a feedback current in an amount required to produce a voltage differential between said reference voltage and said voltage produced by the generator;

an excitation current measurement unit for measuring current in the excitation winding;

a voltage regulating unit for receiving an error signal between said feedback current and said excitation winding current and determining an amount of supplemental current; and said voltage source inverter for applying the amount of supplemental current to said excitation winding required for the generator to produce the reference voltage.

19. The generator of claim 16 wherein said voltage source inverter provides reactive power to the excitation winding.

* * * * *